(12) United States Patent
Jilkén (10) Patent No.: US 12,410,945 B2
(45) Date of Patent: Sep. 9, 2025

(54) ARRANGEMENT, SYSTEM AND METHOD FOR PRODUCING HOT WATER FROM SOLAR ENERGY

(71) Applicant: Leif Jilkén, Kalmar (SE)

(72) Inventor: Leif Jilkén, Kalmar (SE)

(*) Notice: Subject to any disclaimer, the term of this patent is extended or adjusted under 35 U.S.C. 154(b) by 376 days.

(21) Appl. No.: 18/031,469

(22) PCT Filed: Sep. 9, 2021

(86) PCT No.: PCT/SE2021/050860
§ 371 (c)(1),
(2) Date: Apr. 12, 2023

(87) PCT Pub. No.: WO2022/081059
PCT Pub. Date: Apr. 21, 2022

(65) Prior Publication Data
US 2024/0035708 A1    Feb. 1, 2024

(30) Foreign Application Priority Data
Oct. 14, 2020   (SE) .................... 2051194-5

(51) Int. Cl.
*F24S 10/70* (2018.01)
*F24S 80/00* (2018.01)

(52) U.S. Cl.
CPC .......... *F24S 10/72* (2018.05); *F24S 10/73* (2018.05); *F24S 2010/71* (2018.05); *F24S 2080/015* (2018.05)

(58) Field of Classification Search
CPC .. F24S 10/73; F24S 70/14; F24S 10/72; F24S 80/10; F24S 2080/015; F24S 2010/71; F24S 30/00; Y02B 40/18; C02F 1/14
See application file for complete search history.

(56) References Cited

U.S. PATENT DOCUMENTS

| 4,136,675 A | 1/1979 | Karasick |
| 8,122,944 B2* | 2/2012 | Clark ............. F24D 3/142 165/53 |

(Continued)

FOREIGN PATENT DOCUMENTS

| CN | 201093773 Y | 7/2008 |
| FR | 2368673 B3 | 7/1980 |

(Continued)

OTHER PUBLICATIONS

International Search report for PCT/SE2021/050860, prepared by the European Patent Office, mailing date Nov. 29, 2021, 4 pages.

(Continued)

*Primary Examiner* — Alfred Basichas
(74) *Attorney, Agent, or Firm* — Brooks Kushman P.C.

(57) ABSTRACT

An arrangement for producing hot water from solar energy, the arrangement comprising: an elongate solar collector device extending along a longitudinal direction (X) from a first end to an opposite second end, the elongate solar collector device consisting of an elongate profile having walls that in between them define elongate cavities extending from the first end to the second end, the elongate solar collector device having at least one first opening for receiving water into the elongate cavities, and at least one second opening for tapping off water, arranged at a middle part of the elongate solar collector device; and at least one valve adapted to be arranged in a respective one of the at least one second opening, the valve being openable and closable in order to be able to tap off any water housed in the cavities.

16 Claims, 4 Drawing Sheets

(56) References Cited

U.S. PATENT DOCUMENTS

| | | | |
|---|---|---|---|
| 8,695,298 B2 | 4/2014 | Jilken | |
| 10,364,993 B2 | 7/2019 | Jilken | |
| 10,386,094 B2 * | 8/2019 | Jilkén | ................... F24S 70/14 |
| 2009/0255528 A1 | 10/2009 | Weise et al. | |
| 2015/0322677 A1 | 11/2015 | Shiao et al. | |
| 2018/0073747 A1 * | 3/2018 | Jilkén | .................. F28F 21/066 |
| 2018/0135889 A1 | 5/2018 | Jilkén | |

FOREIGN PATENT DOCUMENTS

| | | | |
|---|---|---|---|
| FR | 2421349 B1 | 1/1984 |
| GB | 2099133 A | 12/1982 |
| JP | H11304256 A | 11/1999 |
| WO | 2009039598 A2 | 4/2009 |
| WO | 2011064715 A2 | 6/2011 |
| WO | 2014181143 A1 | 11/2014 |

OTHER PUBLICATIONS

Solvatten, retrieved from solvatten.org/what-is-solvatten/ on Apr. 12, 2023, 8 pages.

* cited by examiner

ARRANGEMENT, SYSTEM AND METHOD FOR PRODUCING HOT WATER FROM SOLAR ENERGY

CROSS-REFERENCE TO RELATED APPLICATION

This application is the U.S. national phase of PCT Application No. PCT/SE2021/050860 filed on Sep. 9, 2021, which claims priority to SE Patent Application No. 2051194-5 filed on Oct. 14, 2020, the disclosures of which are incorporated in their entirety by reference herein.

TECHNICAL FIELD

The present invention relates generally to arrangements for producing hot water from solar energy, a system and a method thereof. More specifically, the present invention relates to an arrangement, system and method for producing hot water from solar energy comprising a bendable solar collector.

BACKGROUND ART

Solar energy is the basis for all life on earth. The total amount of solar energy falling onto the earth is approximately 15.000 times larger than the energy consumed in total by the human society today. Also, solar energy falling onto earth is an endless and free energy resource. Still further, solar energy is quite environmentally friendly. Consequently, the solution to the climate crisis and the world's need of energy lies in the possibility to transfer solar energy into useful, storable energy for the human society.

In some parts of the world where there is no central water supply grid, for example in rural parts of developing countries, to attain fresh and/or hot water means lots of labor. As an example, people may need to walk a long way to attain water and/or firewood used for heating up water to a temperature suitable for e.g. household purposes such as washing. Further, large use of firewood for heating has a bad impact on both the local and global environment. Still further, using firewood in large amounts for heating over open fires or with bad ventilation may cause health problems. Consequently, there is a need for devices and methods that in a cost-effective manner can provide fresh and/or hot water close to people living or being in areas with no central water supply grid, the water being suitable for household purposes such as washing clothes, cleaning dishes, bathing and possibly drinking.

One such device and method is called "Solvatten". Solvatten is described in https://solvatten.org/what-is-solvatten/. Solvatten uses solar energy to heat up water to a temperature where the water is guaranteed not to contain any pathogenic material. Solvatten is a combined portable water treatment and water heating system designed for off-grid household use in the developing world. Solvatten comprises a bag-like unit with a handle so that the unit can be carried easily and two 5-liter containers, each of which can be filled with water through an opening containing a filter. After being filled, the unit is placed in direct sunlight, which heats the water inside and simultaneously exposes it to ultraviolet (UV) radiation. The water inside will then be heated to a temperature up to 75° C. As a result, after 2-6 hours, depending on outer conditions such as temperature and amount of direct sunlight, the water inside will be hot and free of pathogenic material. In addition, the UV radiation destroys the formation of DNA linkages in microorganisms and prevents them from reproducing.

Solvatten is in many ways a terrific invention that is cost-efficient and that effectively heats and cleans water using solar energy, which is a free, clean energy resource. Also, the Solvatten unit suits very well for the small family and can be carried rather easily. However, the device has some limitations in that the size of the containers is predefined. In other words, only 5+5 liters of water can be heated at a time. For example, it could be of interest to have a central device in a village, where people in the village can come and collect hot water. Then the Solvatten container would not be enough and the village would need many such units. Moreover, the transparent layer needs to be constantly cleaned in order to allow the sunlight to reach the absorbing layer of the device, thereby warming the water. Consequently, there is a need for a device or arrangement that in a cost-effective manner can provide hot water close to people living or being in areas with no central water supply grid, which device or arrangement can easily be produced in a size that can be adapted, e.g. to an amount of people living together, and that needs low maintenance.

SUMMARY OF INVENTION

It is an object of the invention to address at least some of the problems and issues outlined above. It is possible to achieve these objects and others by using devices as defined in the attached independent claims. It is another object of the disclosure to provide a simple, cost-effective and adaptable arrangement that heats a liquid, such as water, using solar energy. It is yet another object of the disclosure to provide a system comprising a plurality of arrangements that heats a liquid using solar energy.

The invention is built on the idea of using an elongate solar collector as developed and presented by the applicant in granted European patent EP 2167747 B1 and in International patent application WO2016/043648 A1 for providing hot water for household purposes. The solar collectors of EP 2167747 and WO2016/043648 A1 are both energy efficient and at the same time very cost-efficient. The solar collectors were developed to be used as both a construction element and a solar collector at the same time. It is ideal for such purposes, as it is produced in one piece from a comparatively cheap material that is still stable and can resist heavy loads. The solar collector is then used as a part of e.g. a wall or roof of a house. When being used in the wall or roof, water warmed up in the solar collector is used to heat up the house, using a water-based central heating system, hereby solving the problems of providing both building material and heat to a building at the same time.

When looking into the different problem of providing hot water close to people living or being in areas with no central water supply grid, the inventor came up with the idea of adapting the above solar collectors so that they can be used for providing hot water instead of as combined building material and energy resource in central heating systems.

This is achieved by an arrangement for producing hot water from solar energy comprising an elongate solar collector device extending along a longitudinal direction from a first end to an opposite second end. Further, the elongated solar collector device consists of an elongated profile having walls that in between them define elongated cavities extending from the first end to the second end, the elongate solar collector device being arranged to house water in the cavities. Further, the material of the elongate solar collector device comprises a polymer reinforced with an organic fiber material and is produced by extrusion. Further, the elongate solar collector device comprises at least one first opening for receiving water into the elongate cavities, the at least one first opening being arranged at the first end and/or the second end. Further, the solar collector device comprises at least one second opening for tapping off water, arranged at a middle part of the elongate solar collector device, the middle part being arranged at approximately the same distance from the first end as from the second end. Further, the arrangement comprises at least one valve adapted to be arranged in a respective one of the at least one second opening, the valve being openable and closable in order to be able to tap off any water housed in the cavities, when in use.

As the elongate solar collector device is produced by extrusion molding, the length of the device, and consequently the amount of water that the device can contain can be easily adapted to the needs of the society, group of people or family where it is to be used. In other words, by extruding different lengths of the solar collector device, different total volumes in the elongated cavities are achieved. Still further, the material of the solar collector device, i.e. a polymer reinforced with an organic fiber material is cost-efficient and durable. The polymer may be, for instance, a thermoplastic or an elastomer, while the organic fiber material may be, for instance, wood fiber. In a preferred embodiment, the amount of polymer is higher than the amount of organic fiber. The amount of polymer may range from 55% to 95%, while the amount of organic fiber may range from 5% to 45%. This configuration provides a solar collector device having a bending capacity, as further explained below. Also, the lifetime of the solar collector device is longer as for example there is no risk of corrosion. Still further, the solar collector device is durable to outer influences such as outer mechanical stress. Still further, as the solar collector device is made from a polymer-based fiber composite, the solar collector device does not become burning hot when out in the sun in a hot environment as regular solar collectors become, and therefore there is no or at least low risk of getting burnt on the solar collector. By equipping the middle part of the solar collector device with a second opening for tapping off water, and a valve in the opening, the water that has warmed up can then be tapped off by using the valve at the middle part of the device. The second opening and valve located at the middle part of the solar collector device may be arranged at the side surface of the solar collector device. Also by putting the opposite end regions of the solar collector device onto supports and fill the solar collector device with water, the middle part of the solar collector device will bend by gravity, especially when the solar collector device warms up, and water inside the solar collector device will tend to move by gravity towards the middle part of the solar collector device, where the second opening and the valve is situated.

The arrangement for producing hot water including the mentioned solar collector device may advantageously be displaced from one position to another, i.e., it is mobile. Typical solar collector devices must be placed at one position and are difficult to move, while some solar collector arrangements may even need small motors or other devices in order to displace the arrangement. The arrangement according to the disclosure can be easily moved to different locations since it is a one-piece solar collector device equipped with at least one outlet opening with at least one valve, and does not comprise sensitive components such as glass, cables etc.

According to one exemplary embodiment, the arrangement further comprises a first support onto which a first part of the elongate solar collector device proximate the first end is to be arranged, and a second support onto which a second part of the elongate solar collector device proximate the second end is to be arranged. By providing the arrangement with such first and second supports, there is no need to find such supports anywhere in the surroundings where the arrangement is to be used. The first and second support help achieving the bending of the solar collector device, thereby concentrating the water in the middle part of the device.

The arrangement advantageously comprises a solar collector adaptable for different needs, which may include varying the length of the solar collector device and/or number of cavities. If the arrangement is to provide hot water for a small village, the length of the solar collector device should be longer. If the final user is one person or a small family, the solar collector device is produced having a shorter length. Moreover, the number of cavities may be adapted to the size of the device and/or the need of the final user. The solar collector device may comprise a plurality of cavities, but preferably 4-5 cavities. According to a tested example, the cross section of the solar collector device may have about 350 mm of width and about 35 mm of height including 5-6 cavities. In this example, the arrangement can hold approximately 10 l water per length meter.

According to one exemplary embodiment, the arrangement further comprises at least one stop or filter arranged at a respective one of the at least one first opening. The filter material hinders small animals or pollutants such as dust and sand to enter the elongate solar collector device. Simple materials such as cloth or cotton may be used as a filter and can be easily changed when needed.

According to one exemplary embodiment, the arrangement further comprises a third support onto which the middle part of the elongated solar collector is to be arranged, the third support being shorter than the first and second supports. The third support may avoid the lowermost part of the solar collector to reach the floor while bending, thereby protecting the device and/or other parts such as the valve. The third support is shorter than the first and second supports in order to allow an enough amount of bending for the water to be transferred to the center of the device by gravity.

According to another exemplary embodiment, the arrangement further comprises a cover that surrounds the elongated solar collector device. The cover material may be soft plastic, such as polyethylene and may mitigate convection.

According to another exemplary embodiment, the arrangement further comprises at least one funnel adapted to be positioned in at least one of the at least one first opening. Further, the funnel may be arranged so that when inserted into the first opening and when the arrangement is in use, the inlet opening of the funnel points upwards, towards the sky. The funnel may be any device suitable for collecting rainwater or for allowing filling the solar collector device with water in an easy manner. The funnel may be any device having a large open top tapering downwardly towards a reduced open bottom. Moreover, the funnel may be removed from the at least one first opening when there is no need for filling the device with water or when no rain is expected.

According to one exemplary embodiment, the at least one second opening comprises a plurality of openings arranged at the middle part of the solar collector and may be spread out along the longitudinal direction. This arrangement allows a simultaneous water collection by different users. Further, since the plurality of openings are arranged at the middle part of the solar collector device, tapping off water from the device is favored by gravity.

According to another exemplary embodiment, the cavities are a plurality of parallel cavities defined between the walls of the elongate solar collector device, and wherein the at least one second opening may extend through inner walls of the elongate solar collector device so that water can flow from all of the plurality of cavities and out through an outer wall of the elongate solar collector device to the at least one valve. The arrangement according to this embodiment facilitates water transportation from all cavities to the second opening, including when the solar collector device is bent due to gravity and/or water temperature. The cavities collect and heat up water in an independent manner, and therefore the whole arrangement is still functional in case one or more of the cavities presents an issue, such as leakage or clogging. Moreover, the walls defining the plurality of cavities provides a force-resistant solar collector device. Also, more water is in contact with the walls, thereby increasing the warming capacity of the solar collector device.

According to an exemplary embodiment, the arrangement can be equipped with a temperature sensor that senses the temperature of water inside the solar collector device. The temperature sensor may be connected to an indication device that indicates the temperature measured. The indication device may be a display that shows the temperature measured by the temperature sensor and/or that displays an indication that water has reached a temperature ready to be used. The temperature sensor may be connected to a signal device that is arranged to emit a signal, e.g. sound or light, when the water is ready to be tapped.

According to one exemplary embodiment, the arrangement further comprises a weight adapted to be arranged onto the middle part of the elongated solar collector device after the device has been arranged onto the first and second supports. The weight may provide the initial bend at the middle part of the solar collector device and therefore may help filling the device with water. Further, the weight may be temporarily or permanently used, depending on factors such as the amount of water inside the solar collector device, length of the device and weather conditions (radiation, temperature, etc.). The weight may be especially useful for devices having a relatively short length, where the amount of water is not sufficient to provide an initial bending of the solar collector device.

According to one exemplary embodiment, the arrangement further comprises at least one wheel arranged at the first end or the second end of a side surface of the solar collector device. The at least one wheel advantageously provides additional mobility to the arrangement so that it can be easily transported by one person to, for instance, a place with higher solar radiation. The at least one wheel may be fixed to or removable from the solar collector device.

According to another exemplary embodiment, the arrangement further comprises the solar collector device having the elongated profile in a transverse direction built up of U-beams at each end, connected by one or more I-beams. This arrangement generates a strong construction that is resistant to bending forces at a longitudinal and/or width extension directions, and at the same time being bendable by forces applied at a transverse height extension direction of the solar collector device.

According to another exemplary embodiment, the arrangement comprises a ratio of the polymer material to the organic fiber material in the elongate solar collector arrangement of approximately 2:1. This ratio of polymer material and organic fiber material advantageously provide a bendable solar collector device that is not so loose or soft that would break when filled with water and/or when heated by the sun. In an alternative embodiment, the solar collector device may comprise about 60-75% of polymer and about 40-25% of organic fiber material.

Another aspect of the disclosure concerns a system comprising a plurality of arrangement as described in the previous embodiments. The system comprises a plurality of arrangements having the solar collector devices arranged in a star configuration, with their first ends pointing towards the center of the star configuration. Further, the at least one first openings of each solar collector device is arranged at the first end and the system further comprises a funnel arranged at the center of the star configuration, the funnel outlet being connected to the first openings. The system may comprise arrangements other than the star configuration depending on the place where they will be installed. The system advantageously provides warm water in a large volume, which is suitable for a village having many people and/or animals. Moreover, the system is arranged in a way that manually filling the solar collector devices is made easier since they share a same inlet (i.e., the funnel).

Another aspect of the disclosure concerns a method for heating water with solar energy using an elongated solar collector device, wherein the elongated solar collector device comprises a first end and an opposite second end. Further, the elongate solar collector device has at least one first opening for receiving water into the elongate cavities arranged at the first end and/or the second end, and at least one second opening for tapping off water, arranged at a middle part of the elongate solar collector device, the middle part being arranged at approximately the same distance from the first end as from the second end; and at least one valve adapted to be arranged in a respective one of the at least one second opening, the valve being openable and closable in order to be able to tap off any water housed in the cavities. The method comprises arranging the elongated solar collector device on at least a first support adjacent to the first end and second support adjacent to the second end such that the middle part of the elongated solar collector device bends between the supports placing the valve horizontally below the first and second ends, and filling, through the at least one first opening, the elongated solar collector device with water up to a level where, after the filling, the cavities will contain water up to the filling level and air above the filling level. Hereby, as water inside the solar collector device warms up and expands, air can escape through the first openings and the water will still stay inside the solar collector device. The first support and the second support may be supports, such as stands, which belong to a system comprising the supports and the elongated solar collector device. The supports may also be supports existing in the environment onto which supports the elongated solar collector device is arranged. Such supports may be trees etc. When the supports are trees, the first and second end of the elongated solar collector device can be hanged up onto branches of each respective tree. The filling of water into the elongated solar collector device may be performed before placing the ends onto the supports, but more preferably after placing the ends onto the supports.

According to one embodiment, the method for heating water comprises an elongated solar collector device according to any previous embodiment.

BRIEF DESCRIPTION OF DRAWINGS

The invention is now described, by way of example, with reference to the accompanying drawings, in which.

DESCRIPTION OF EMBODIMENTS

In the following, a detailed description of exemplary embodiments of the arrangement for producing hot water and a system thereof will be discussed. It should be emphasized that the embodiments shown are used as examples only and are in no way intended to limit the scope of the disclosure.

Figure 1:
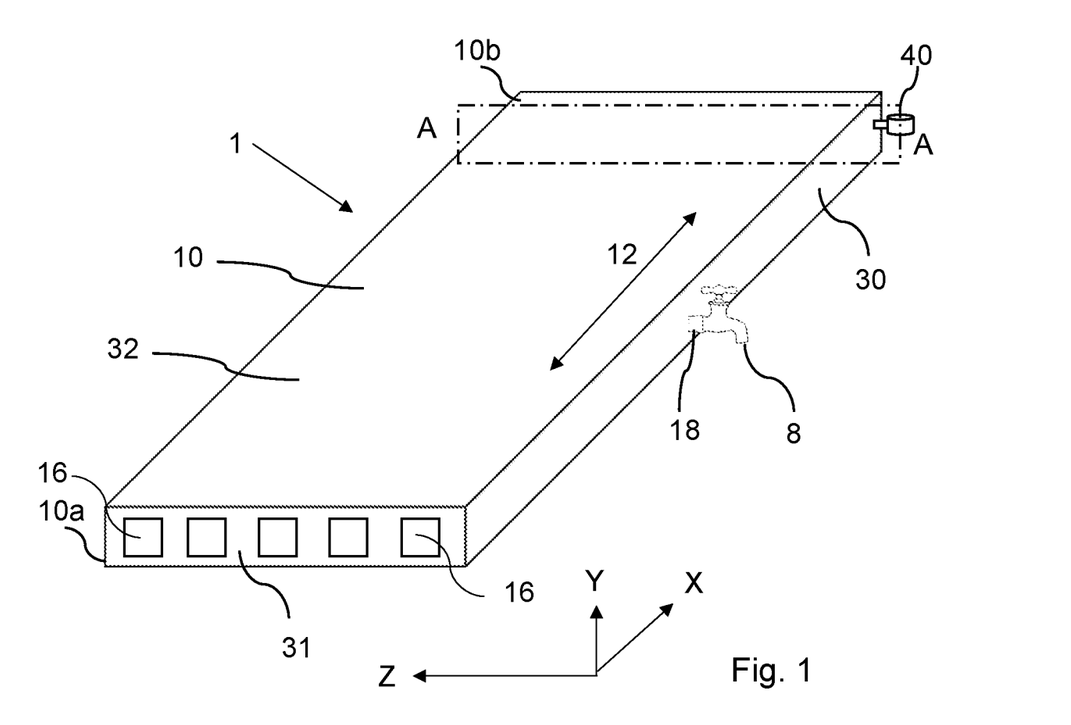
FIG. 1 illustrates an arrangement for producing hot water comprising a solar collector device, according to one exemplary embodiment.

FIG. 1 discloses a schematic drawing of an arrangement for producing hot water 1 comprising a solar collector device 10. The elongated solar collector device 10 has cuboid shape and is arranged in space having a longitudinal (or length) extension direction X, a transverse (or height) extension direction Y and a width extension direction Z. X, Y and Z defines axes in a Cartesian coordinate system. The elongated solar collector device 10 extends on a longitudinal direction X; in other words, horizontally, in order to increase the warming capacity of the solar collector device. The solar collector device 10 is elongated from a first end to an opposite second end 10b, thereby generating main surfaces 32 long-side surfaces 30 and short-side surfaces 31. The main surfaces 32 and the long-side surfaces 30 extend along the longitudinal direction X from the first end 10a to the opposite second end 10b, the long-side surfaces 30 having a smaller area than the main surfaces 32. The short-side surfaces 31 are arranged at the first end and the second end 10b, respectively, and extend in the width direction Z. The elongated solar collector device 10 has a high surface/volume ratio area, which is relevant when collecting solar energy for warming water. Further, the solar collector device 10 has longitudinal cavities 16. The cavities 16 extend from the first end 10a to the second end 10b. Since the cavities 16 have open ends, overpressure inside them due to warmed water is avoided. The embodiment of FIG. 1 shows five cavities 16, but the number of cavities may be higher and possibly also lower, depending on the final use of the solar collector device 10. Furthermore, the solar collector device 10 has a second opening 18 arranged at one of the side surfaces 30 of a middle part 12 of the solar collector device 10. The second opening 18 functions as an outlet for water inside the solar collector device 10. Further, the arrangement 1 has a valve 8 connected to the second opening 18. In FIG. 1, the valve 8 is shown as a tap, however other simpler valve arrangements may be used, such as a tapered pin. The solar collector device 10 is made of a polymer reinforced with an organic fiber material. The polymer can be, for instance, a thermoplastic or an elastomer. The organic fiber material can be, for instance, wood fiber. The polymer reinforced with organic fiber material generates a composite that has a bending capacity at the transverse direction Y due to gravity. In order to achieve suitable bending characteristics for this arrangement, it has been found out by testing that the ratio between polymer and organic fiber material should be approximately 2:1. In other words, it should be around 60-75% polymer and 40-25% organic fiber material in the solar collector device. The bending of the solar collector device also depends on factors such as amount of water in the cavities 16 and/or solar collector device temperature. The more water inside the cavities, the more weight is inside the solar collector device, thereby promoting the bending. Further, the temperature of the solar collector device 10 itself also increases due to the solar radiation absorbed, which also increases the bendability of the solar collector device 10.

Figure 2:
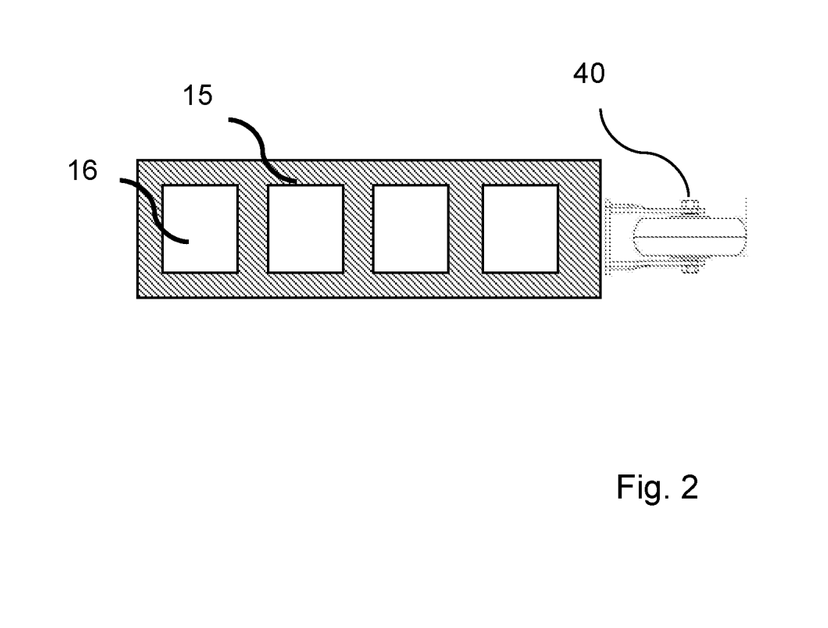
FIG. 2 illustrates a cross section view at section A-A of FIG. 1, according to one exemplary embodiment.

FIG. 2 discloses a schematic drawing of a cross-sectional view of the solar collector device 10 at section A-A of FIG. 1. The solar collector device 10 in this embodiment has four elongated cavities 16, compared to five in FIG. 1, the cavities being defined by walls 15. However, other number of cavities may apply. The cavities 16 are substantially parallel and extend from the first end 10a to the second end 10b of the solar collector device 10. To facilitate transportation, the solar collector device 10 may also comprise a wheel 40 arranged at the second end 10b of the side surface 30 of the solar collector device 10, see also FIG. 1.

Figure 3:
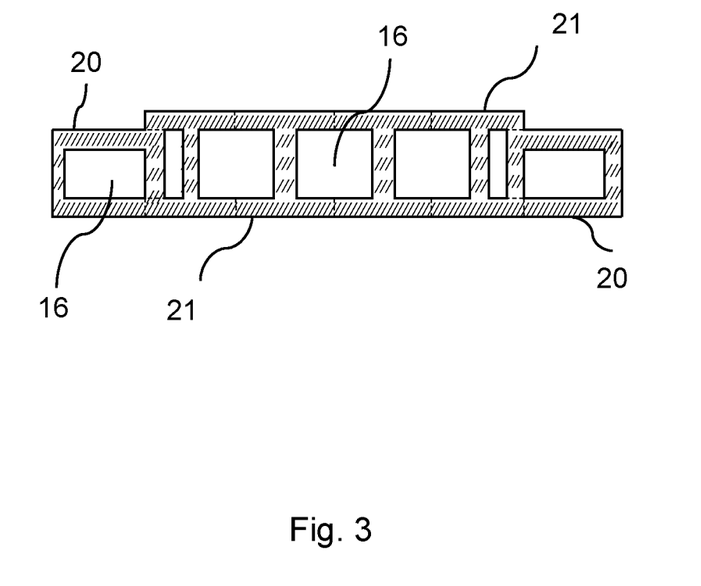
FIG. 3 illustrates a cross section view of the solar collector device showing I-beams and U-beams, according to one exemplary embodiment.

FIG. 3 discloses a schematic drawing of a cross section showing the elongated cavities 16 defined by the walls 15. The cross-sectional profile is perpendicular to the longitudinal extension direction X of the solar collector device 10, in each point of the longitudinal extension. The cross section consists of I-beams 21 and U-beams 20, which protects the unit from collapsing. The solar collector device 10 may be manufactured comprising a plurality of I-beams 21 between two U-beams 20, the number of I-beams 21 and therefore cavities 16 according to the needs for the solar collector 10. The manufacturing process of the solar collector device 10 is an extrusion process. This configuration advantageously provides a solar collector device 10 resistant to forces applied on the longitudinal extension direction X and/or width extension direction Z of the solar collector device 10, and at the same time being bendable on the transverse extension direction Y of the solar collector device 10. Furthermore, the solar collector device 10 can be easily transported in an upright position, the upright position being a position where one long-side surface 30 and/or one of short-side surface 31 is facing upwards. In some embodiments, the U-beams 20 cross section has a different length and/or height in relation to the I-beams 21. Preferably, the U-beams 20 has a smaller length and/or height in relation to the I-beams 21.

Figure 4:
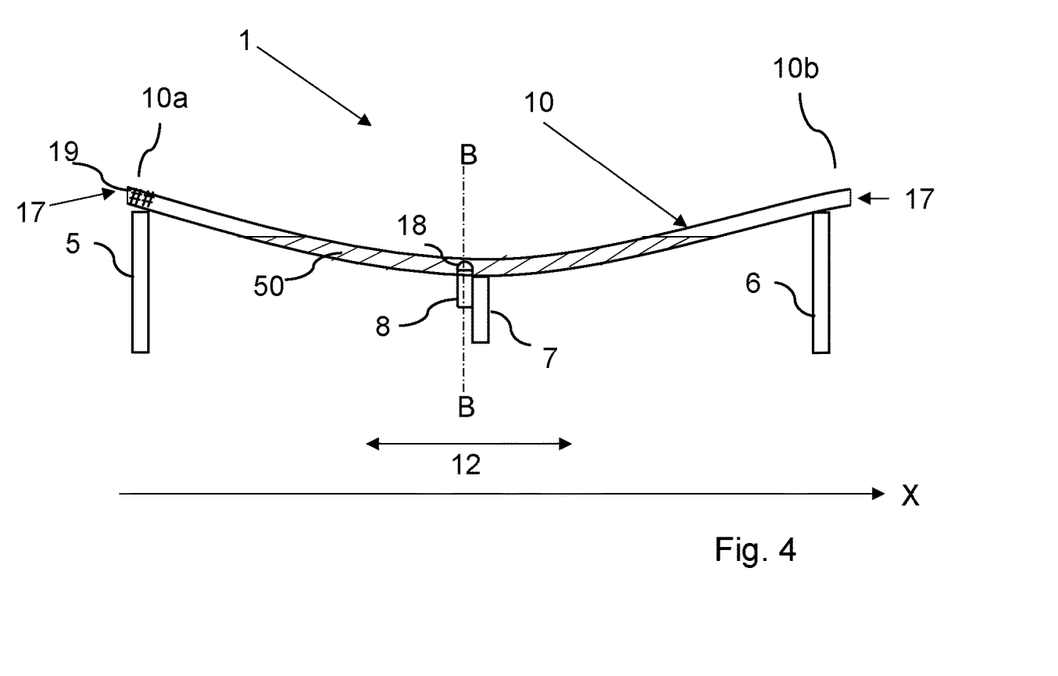
FIG. 4 illustrates an arrangement for producing hot water, according to one exemplary embodiment.

FIG. 4 discloses a schematic drawing of an arrangement for producing hot water. The arrangement 1 comprises the solar collector device 10 as previously described. Further, the solar collector device 10 has a first opening 17 arranged at the first and/or second end 10a, 10b for receiving water into the cavities 16 (see FIG. 3 or 5). The first opening 17 can collect rainwater into the solar collector device 10 or can be used to fill the solar collector device 10 with water manually. The solar collector device 10 may further comprise at least one stop or filter 19 arranged at the first opening 17. The arrangement 1 further comprises a first support 5 and a second support 6 arranged at the first end 10a and the second end 10b of the solar collector device 10, respectively. The supports keep the ends of the solar collector device 10 at approximately the same height, while the middle part is bent due to the weight of the water inside the solar collector device 10 or due to an increased temperature of the solar collector device 10.

The arrangement 1 further comprises a second opening 18 located approximately equidistant to the first end 10a and the second end 10b of the solar collector device 10. The second opening 18 may be located at a part 12 close to the middle of the solar collector 10, preferably at a side surface 30. When the solar collector device 10 is bent (as shown is FIG. 4), the lowermost part of the solar collector device 10 is at the same location as the second opening 18, which facilitates water collection through the second opening 18. In order to control the water collection from the second opening 18, a valve 8 is arranged at the exit of the second opening 18. The valve 8 has an opened and closed state, which can be used when water is needed or not needed. The valve 8 may be for example a tap, a plunger or an elongate pin that tapers from its first end to its opposite second end, the second end of the elongate pin being adapted to be inserted into the second opening 18. By putting the opposite end regions of the solar collector device onto supports 5, 6 as in FIG. 4, and filling the cavities of the solar collector device with water, the middle part of the solar collector device will bend by gravity, especially when the solar collector device warms up. Further, water 50 inside the solar collector device will tend to move by gravity towards the middle part 12 of the solar collector device, where the second opening 18 and the valve 8 is situated. Water 50 inside the solar collector device 10 is marked in FIG. 4 with a striped pattern. As can be seen by the pattern, there will be a water surface inside the cavities of the solar collector device. In other words, the solar collector device is arranged to be filled with water up to a certain level. Above the cavities there will be air. As the water is warmed up, it will expand, and the water level will rise. For this reason, the stop or filter may be arranged with a possibility to let air, and possibly also water, out and in, even if it prevents small animals or similar to enter. When the solar collector device 10 is empty, it may unbend to its original shape. This process can be repeated several times.

The embodiment of FIG. 4 also shows a third support 7 located at the middle part 12 of the solar collector device 10. The third support 7 is shorter than the first 5 and second 6 supports and is added to avoid the solar collector device and/or the valve 8 reaching the ground during bending. This is of special interest for solar collector devices 10 that have a comparatively long longitudinal extension X. Even though longer solar collector devices 10 may tend to bend more easily as its temperature increases, comparatively shorter solar collector devices may also bend. Thus, the third support 7 may be also needed for the shorter solar collector devices 10. Also, by such a third support 7, the position of the valve 8 can be adapted to a suitable position for a person tapping off water. As the third support 7 is shorter than the first support 5 and second support 6, water inside the cavities will end up in the middle part 12 of the solar collector device 10.

Figure 5:
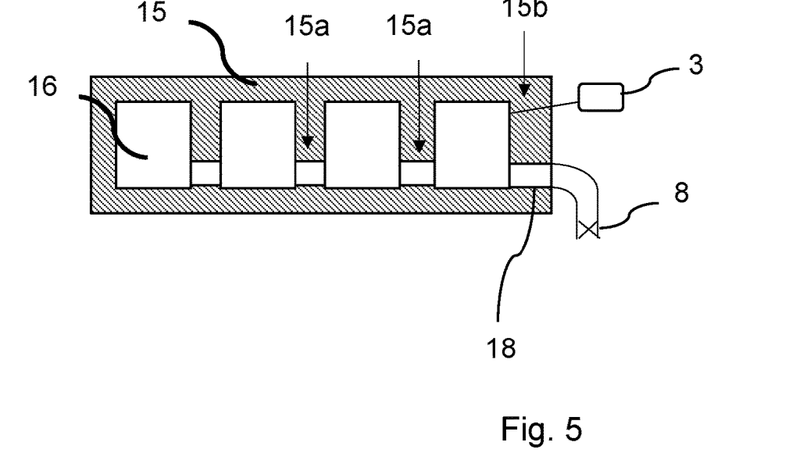
FIG. 5 illustrates a cross section view at section B-B of FIG. 4, according to one exemplary embodiment.

FIG. 5 discloses a schematic drawing of B-B cross section of FIG. 4. This schematic drawing shows a cross section where the second opening 18 and the valve 8 may be located. The second opening 18 extends through inner walls thereby connecting the cavities 16 to the second opening 18. The liquid from the cavities 16 can be transported through the outer wall 15b of the solar collector device 10 to the valve 8. This arrangement allows all liquid from the cavities 16 to be directed to the second opening 18, when the solar collector device 10 is bent. Furthermore, an indication device 3 connected to a temperature sensor (not shown) may display the water temperature in the cavities 16. The indication device 3 may show a sign that the water is ready/not ready, for instance a green/red light and/or a specific sound.

Figure 6:
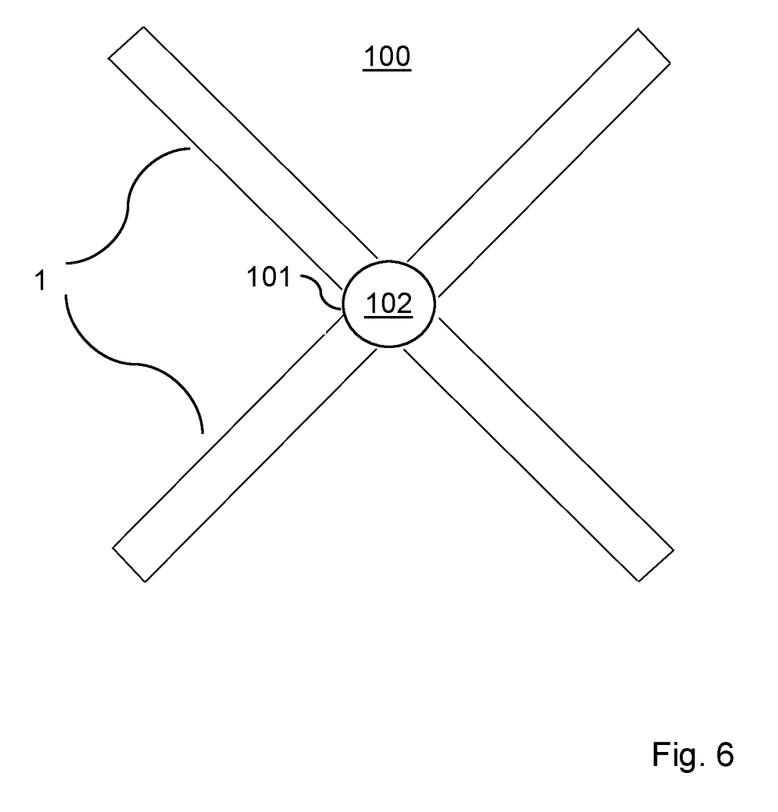
FIG. 6 illustrates an upper view of the system comprising a plurality of arrangements, according to one exemplary embodiment.

FIG. 6 discloses a schematic drawing showing an upper view of a system 100 comprising a plurality of arrangements 1. The system 100 is organized in a star configuration, where the first ends 10a are pointing towards the center 101 of the system 100. The center 101 of system 100 has a water collector device, preferably a funnel 102, so that the rainwater collected by the funnel 102 is transferred to the first opening 17 of the arrangements 1. The rainwater collected by the funnel 102 is distributed to all arrangements 1.

The system 100 may comprise a plurality of arrangements 1 arranged in configurations other than the star configuration, which will depend on the space available at a site where the system is to be arranged. The system 100 can be used for providing hot water to several people, such as for a small village.

The invention claimed is:

1. An arrangement for producing hot water from solar energy, the arrangement comprising:
   an elongate solar collector device extending along a longitudinal direction (X) from a first end to an opposite second end, the elongate solar collector device consisting of an elongate profile having walls that in between them define elongate cavities extending from the first end to the second end, the elongate solar collector device being arranged to house water in the cavities, the material of the elongate solar collector device being a polymer reinforced with an organic fiber material, the elongate solar collector device being produced by extrusion, the elongate solar collector device having at least one first opening for receiving water into the elongate cavities, the at least one first opening being arranged at the first end and/or the second end, and at least one second opening for tapping off water, arranged at a middle part of the elongate solar collector device, the middle part being arranged at approximately the same distance from the first end as from the second end; and
   at least one valve adapted to be arranged in a respective one of the at least one second opening, the valve being openable and closable in order to be able to tap off any water housed in the cavities, when in use.

2. The arrangement according to claim 1, further comprising a first support onto which a first part of the elongate solar collector device proximate the first end is to be arranged, and a second support onto which a second part of the elongate solar collector device proximate the second end is to be arranged.

3. The arrangement according to claim 2, further comprising a third support onto which the middle part of the elongate solar collector device is to be arranged, the third support being shorter than the first and second support.

4. The arrangement according to claim 2, further comprising a weight adapted to be arranged onto the middle part of the elongate solar collector device.

5. The arrangement according to claim 1, further comprising at least one stop or filter arranged at a respective one of the at least one first opening.

6. The arrangement according to claim 1, further comprising a covering that surrounds the elongate solar collector device to mitigate convection.

7. The arrangement according to claim 1, further comprising at least one funnel adapted to be positioned in at least one of the at least one first opening, the funnel being arranged so that when inserted into the first opening and when the arrangement is in use, the inlet opening of the funnel points upwards, towards the sky.

8. The arrangement according to claim 1, wherein the at least one second opening is a plurality of openings arranged at the middle part of the solar collector device and spread out along the longitudinal direction (X).

9. The arrangement according to claim 1, wherein the at least one second opening extends through inner walls of the elongate solar collector device so that water can flow from all of the cavities and out through an outer wall of the elongate solar collector device to the at least one valve.

10. The arrangement according to claim 1, further comprising a temperature sensor for sensing a temperature of water inside the cavities and an indication device connected to the temperature sensor for indicating the temperature of the water inside the cavities.

11. The arrangement according to claim 1, further comprising at least one wheel arranged at the first end or the second end of a side surface of the solar collector device.

12. The arrangement according to claim 1, wherein the elongate profile in a transverse direction (Y) is built up of a U-beam at each end connected by one or more I-beams.

13. The arrangement according to claim 1, wherein a ratio of the polymer material to the organic fiber material in the elongate solar collector arrangement is approximately 2:1.

14. A system comprising a plurality of arrangements as defined in claim 1, wherein the elongate solar collector devices of the plurality of arrangements are arranged in a star configuration with their first ends pointing towards a center of the star configuration, wherein the at least one first openings of each solar collector device is arranged at the first end, the system further comprising a funnel arranged at the center of the star configuration, the outlet(s) of the funnel being connected to the first openings.

15. A method for heating water with solar energy using an elongated solar collector device, wherein the elongated solar collector device comprises a first end and an opposite second end, the elongate solar collector device having at least one first opening arranged at the first end and/or the second end for receiving water into a plurality of elongate cavities extending longitudinally between the first end and second end, and at least one second opening for tapping off water, arranged at a middle part of the elongate solar collector device, the middle part being arranged at approximately the same distance from the first end as from the second end; and
at least one valve adapted to be arranged in a respective one of the at least one second opening, the valve being openable and closable in order to be able to tap off any water housed in the cavities, wherein the method comprises the steps:
arranging the elongated solar collector device on at least a first support adjacent to the first end and second support adjacent to the second end such that the middle part of the elongated solar collector device bends between the supports placing the valve horizontally below the first and second ends, and
filling, through the at least one first opening, the elongated solar collector device with water up to a level where, after filling, the cavities will contain water up to the filling level and air above the filling level.

16. The method according to claim 15, wherein the elongated solar collector device is an elongated solar collector device having
an elongate solar collector device extending along a longitudinal direction (X) from a first end to an opposite second end, the elongate solar collector device consisting of an elongate profile having walls that in between them define elongate cavities extending from the first end to the second end, the elongate solar collector device being arranged to house water in the cavities, the material of the elongate solar collector device being a polymer reinforced with an organic fiber material, the elongate solar collector device being produced by extrusion, the elongate solar collector device having at least one first opening for receiving water into the elongate cavities, the at least one first opening being arranged at the first end and/or the second end, and at least one second opening for tapping off water, arranged at a middle part of the elongate solar collector device, the middle part being arranged at approximately the same distance from the first end as from the second end; and
at least one valve adapted to be arranged in a respective one of the at least one second opening, the valve being openable and closable in order to be able to tap off any water housed in the cavities, when in use.

* * * * *